United States Patent
Batcher

(10) Patent No.: US 7,035,277 B1
(45) Date of Patent: Apr. 25, 2006

(54) PRIORITY-BASED ARBITRATION SYSTEM FOR CONTEXT SWITCHING APPLICATIONS

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 09/652,511

(22) Filed: Aug. 31, 2000

(51) Int. Cl.
 *H04L 12/413* (2006.01)

(52) U.S. Cl. .................. 370/447; 370/445; 370/461; 370/462

(58) Field of Classification Search ............. 370/447, 370/459, 462
See application file for complete search history.

(56) References Cited

U.S. PATENT DOCUMENTS

| 5,796,732 | A | * | 8/1998 | Mazzola et al. | ............ 370/362 |
|---|---|---|---|---|---|
| 6,038,234 | A | * | 3/2000 | LaFollette et al. | .......... 370/443 |
| 6,061,361 | A | * | 5/2000 | An et al. | .................... 370/462 |
| 6,092,137 | A | * | 7/2000 | Huang et al. | ............... 710/111 |
| 6,118,787 | A | * | 9/2000 | Kalkunte et al. | ........... 370/445 |
| 6,298,067 | B1 | * | 10/2001 | Tang | ........................ 370/462 |
| 6,516,369 | B1 | * | 2/2003 | Bredin | ....................... 710/111 |

* cited by examiner

*Primary Examiner*—Alpus H. Hsu
*Assistant Examiner*—Justin M. Philpott
(74) *Attorney, Agent, or Firm*—Tucker Ellis & West

(57) ABSTRACT

A priority-based arbiter for arbitrating access to a shared resource by at least two competing devices. The priority-based arbiter intercepts access request signals generated by at least one of the competing devices and generates a respective modified bus request signal. The respective modified bus request signal may be delayed for a predetermined period of time associated with the state (e.g., idle, low priority context, and high priority context) of at least one of the competing devices.

19 Claims, 2 Drawing Sheets

Ducaroir US 7,035,277 B1

PRIORITY-BASED ARBITRATION SYSTEM FOR CONTEXT SWITCHING APPLICATIONS

FIELD OF INVENTION

The present invention generally relates to an arbitration system, and more particularly relates to a priority-based arbitration system for arbitrating access to a shared resource.

BACKGROUND OF THE INVENTION

A common model for network processing consists of a multi-level approach. This is common in many. Ethernet LAN protocols such as IEEE 802.3. The model typically includes 3 major levels, namely (a) Top:Logical-Link control; (b) Middle: Medium Access Control (MAC); and (c) Bottom: Physical interface (PHY).

A wireless LAN configuration compliant to IEEE 802.11 is similar to its wired counterpart and has the same three levels. Traditionally, the top Logical-Link control tasks are handled by software running on a HOST processor. The middle level is the responsibility of a MAC processor, which handles all frame traffic between the HOST and the PHY level.

In a typical wireless local area network (WLAN) configuration, a portable or mobile device (e.g., laptop personal computer) normally includes a PCI card or PCMCIA card. On this card resides a Medium Access Control (MAC) processor (e.g., an embedded processor), a PHY (physical layer) processing device (e.g., a digital signal processor), a shared memory and a shared bus. The MAC processor is a multi-functional processor engine responsible for a variety of different processing tasks associated with the wireless communications. The PHY processing device performs such functions as encoding/decoding waveforms. The memory is shared by a HOST processor (e.g., the main processor of the portable or mobile device where the PCI card is plugged into) and the MAC processor, via the shared bus. The HOST processor accesses the shared bus through a HOST interface (e.g., a PCI or PCMCIA interface) so that it can get access to the shared memory. The HOST processor may need to access the shared memory for a variety of reasons, such as: (a) writing commands to the MAC processor, (b) reading MAC processor status or response to commands, and (c) reading/writing of network packets via the MAC processor.

Commonly, the upper level logic link layer tasks done by the HOST processor have timing requirements that are much more relaxed, compared to the tight timing requirements for the MAC processor operating in accordance with such standards as IEEE 802.11. Thus, the HOST processor actions have a lower priority in general compared to the MAC processor actions. Furthermore, the priority of the tasks done by the MAC processor can be further subdivided. Many of the tasks performed by the MAC processor demand high priority, such as receiving(RX)/sending(TX) data via the PHY processing device, or decrypting data. Other tasks, such as defragmenting of packets to be later off loaded to the HOST processor are lower priority tasks. At other times, the MAC processor may be in an idle state when no processing is needed from the PHY or HOST processor. When an active RX or TX operation is in progress, access to the shared memory by the HOST processor can severely impact the throughput, since the high priority tasks of the MAC processor demand that MAC processor cycles be spent on processing data being received or transmitted to/from the PHY. However, the shared memory impact when the MAC processor is performing a low priority action has negligible effect on throughput.

One prior art approach to the problem of competing requests by the MAC processor and HOST processor for access to the shared memory has been preemptive multi-tasking using context switched threads of code. However, handling of the HOST processor cannot be done entirely with allocation of a programming thread to handle all HOST processor actions. In this regard, at times the HOST processor needs direct access to the bus, which it must also share with the MAC processor for accesses such as DMA (Direct Memory Access). This bus could also be used by the HOST processor for instruction fetch, as well as read/write cycles that access the shared memory which cannot be handled with a software code thread.

With such an open memory model great power and flexibility is provided for the MAC and HOST processors. However, it is impossible for the MAC or HOST processors to predict an access to the shared bus, since the MAC and HOST processors may be performing different actions at the same time. For example, the HOST processor could be sending a packet to the MAC processor for later transmission, while the MAC processor is receiving a high priority frame from the PHY processing device. Therefore, the HOST processor activity is nondeterministic and asynchronous with respect to the MAC processor; and since the HOST processor is completely unaware of MAC processor state, preemptive multi-tasking with threads is not a complete solution. In this regard, software-based threads cannot coordinate or control memory access of the HOST processor on a timely basis.

Other prior art approaches, such as locking and unlocking of the shared bus at time critical instances have too much overhead, and may be prone to problems common with locks, such as "starvation" and "deadlock." It is also difficult to determine just when is something 'time critical' and when it is not, since there is no concept of processor state. Furthermore, prior art approaches that do burst access (e.g., DMA) from the HOST processor to the shared memory are efficient, but may prevent processor access for a long period of time. This may be unacceptable if the MAC processor is performing a high priority action and requires the shared bus, since it will be stalled until the long DMA burst of accesses are complete.

The present invention addresses these and other drawbacks of prior art approaches to arbitration for shared resources, as will be described below.

SUMMARY OF THE INVENTION

According to the present invention there is provided a system for priority-based arbitration to a shared memory, accessible by first and second processors via a shared bus, the system comprising input means for receiving a host bus request signal from the first processor, said host bus request indicating that the first processor desires access to the shared memory via the shared bus; first logic means for receiving context data indicative of the state of the second processor; output means generating a modified bus request signal in response to receipt of the host bus request signal, said modified bus request signal received by a central memory arbiter for arbitrating access to the shared memory; and delay means for delaying generation of the modified bus request signal in accordance with the context data.

According to another aspect of the present invention there is provided a system for priority-based arbitration to a shared resource, accessible by first and second devices, the system comprising a first logic circuit for receiving a first request signal from the first device, said first request signal indicating that the first device desires access to the shared resource; a second logic circuit for receiving context data indicative of the state of the second device; a third logic circuit for generating a modified request signal in response to receipt of the first request signal, said modified request signal received by an arbitration circuit for arbitrating access to the shared resource; and a counter for delaying generation of the modified request signal in accordance with the context data.

According to another aspect of the present invention there is provided a method for priority-based arbitration of a shared resource, accessible by first and second devices, the method comprising receiving a first request signal from the first device, said first request signal indicating that the first device desires access to the shared resource; receiving context data indicative of the state of the second device; generating a modified request signal in response to receipt of the first request signal, said modified request signal received by an arbitration means for arbitrating access to the shared resource, and having a delay in accordance with the context data.

According to another aspect of the present invention there is provided a system for priority-based arbitration to a shared resource, accessible by a plurality of devices, the system comprising means for receiving a respective request signal from at least one of the plurality of devices, said respective request signal indicating that a respective device desires access to the shared resource; means for receiving context data indicative of the state of at least one of the plurality of devices; means for generating a respective modified request signal in response to receipt of the respective request signal, said respective modified request signal received by an arbitration means for arbitrating access to the shared resource; and means for delaying generation of the respective modified request signal in accordance with the context data.

According to another aspect of the present invention there is provided a system for priority-based arbitration to a shared resource, accessible by a plurality of devices, the system comprising a first logic circuit for receiving respective first request signals from at least one of said plurality of devices, said respective first request signal indicating that the respective device desires access to the shared resource; a second logic circuit for receiving respective context data indicative of the state of at least one of said plurality of devices; a third logic circuit for generating a respective modified request signal in response to receipt of the respective first request signal, said modified request signal received by an arbitration circuit for arbitrating access to the shared resource; and a counter for delaying generation of the respective modified request signal in accordance with the context data.

According to another aspect of the present invention there is provided a method for priority-based arbitration of a shared resource, accessible by a plurality of devices, the method comprising receiving a respective first request signal from at least one of the plurality of devices, said first request signal indicating that the respective device desires access to the shared resource; receiving context data indicative of the state of at least one of the plurality of devices; generating a respective modified request signal in response to receipt of the respective first request signal, said respective modified request signal received by an arbitration means for arbitrating access to the shared resource, and having a delay in accordance with the received context data.

An advantage of the present invention is the provision of a priority-based arbitration system which avoids common arbitration problems, such as "starvation" and "deadlock."

Another advantage of the present invention is the provision of a priority-based arbitration system which does not require modification to a central memory arbiter.

Yet another advantage of the present invention is the provision of a priority-base arbitration system which can adapt quickly to a change in system priority states.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

It should be appreciated that while a preferred embodiment of the present invention is described in connection with a MAC processor and HOST processor vying for access to a shared memory via a shared bus, the present invention is applicable to any number of different devices vying for access to a shared resource.

Figure 1:
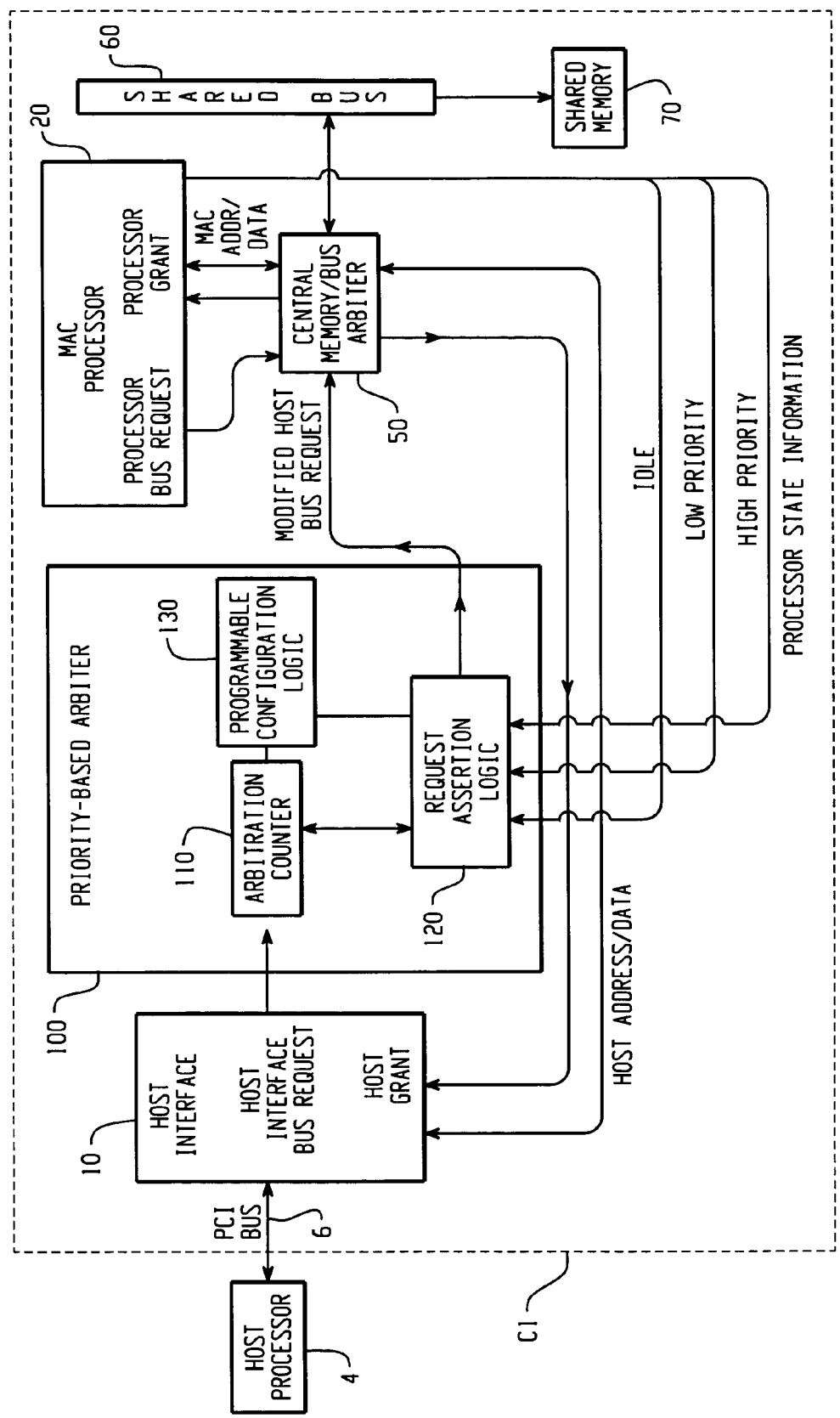
FIG. 1 is a block diagram of an arbitration system according to a preferred embodiment of the present invention.

Referring now to the drawings wherein the showings are for the purpose of illustrating a preferred embodiment of the invention only and not for purposes of limiting same, FIG. 1 shows a HOST and MAC processor configuration, including a priority-based arbiter 100 in accordance with a preferred embodiment of the present invention. As indicated above, HOST processor 4 and MAC processor 20 will vie for access to shared bus 60, so as to access shared memory 70. A central memory/bus arbiter 50 determines which processor will be granted access. Host interface 10, MAC processor 20, Central memory/bus arbiter 50, shared bus 60, shared memory 70, and priority-based arbiter 100 reside on a PCI card C1 in accordance with the illustrated embodiment.

In accordance with a preferred embodiment of the present invention, a HOST interface 10 (e.g., a PCI bus interface) is provided for HOST processor 4 to interface with shared bus 60. In the illustrated embodiment, shared bus 60 takes the form of a Von-Neumann external bus that is shared by MAC processor 20 (which performs instruction fetch and processor read/write) and HOST interface 10 (which performs read/write activity from the HOST Processor via a (PCI) bus 6). HOST interface 10 may take the form of an "intelligent" PCI bus interface, which decodes data received from PCI bus 6. Furthermore, HOST interface 10 may buffer data.

Arbiter 100 includes an arbitration counter 110, request assertion logic 120, and programmable configuration logic 130. Arbiter 100 intercepts the HOST bus request signal of HOST Interface 10, and generates a modified HOST bus request signal, that is sent to central memory/bus arbiter 50.

In accordance with a preferred embodiment, counter 110 takes the form of a 3-bit counter, which causes a delay in the assertion of the modified HOST bus request signal. Since arbiter 100 controls the frequency of the HOST requests for access to shared bus 60 (via assertion of the modified HOST bus request), arbiter 100 controls memory/bus arbitration without directly affecting operation of central memory/bus arbiter 50.

In accordance with an illustrated embodiment of the present invention, central memory/bus arbiter 50 grants access to shared bus 60 to either MAC processor 20 or HOST interface 10, giving each equal priority, wherein access is mutually exclusive. Thus, without priority-based arbiter 100 (i.e., priority disabled), when both bus agents (i.e., HOST interface 10 and MAC processor 20) simultaneously request access to shared memory 70, central memory/bus arbiter 50 will grant access to each bus agent on alternating clock cycles ("first come—first serve"). However, with use of priority-based arbiter 100, priority of the bus agent(s) is used to modify access time without modifying central memory/bus arbiter 50, as will be described in further detail below. Central memory/bus arbiter 50 also controls the Data and Address data path and R/W controls out to the shared bus, so data can be transferred between the HOST Interface 10 or MAC processor 20 and the shared memory 70.

Request assertion logic 120 receives the processor state information (e.g., idle state, low priority context, and high priority context) from MAC processor 20, and interprets it "on the fly." In accordance with a preferred embodiment of the present invention, request assertion logic 120 will receive an 8-bit binary vector indicative of context state. For example, the four highest order bits may be used to indicate one or more high priority contexts are active, while the four lowest order bits may be used to indicate one or more low priority contexts are active (with one bit per context). An idle state is indicated by having none of the 8-bits set.

In accordance with the processor state information, request assertion logic 120 enables arbitration counter 110 to count for the predetermined count value (i.e., MAXCNT) associated with the processor state information. When the counter rolls over from MAXCNT to "0," request assertion logic 120 generates the modified HOST bus request signal, which is received by central memory/bus arbiter 50. In the case of a 3-bit counter, the delay may be from 0 to 8 clock cycles. A zero delay is indicative of no delay (i.e., pass through).

For example, if MAC processor 20 is very busy doing an important high priority task, and HOST processor 4 wants access to shared bus 60, arbiter 100 will only assert a modified HOST bus request signal 1 out of every 8 clock cycles. If MAC processor 20 is determined by request assertion logic 120 to be in an idle state, then arbiter 100 can assert the modified HOST bus request signal as often as it needs to, with no extra cycles imposed by arbiter 100 in between each assertion of the modified HOST bus request signal.

Programmable configuration logic 130 (which is preferably programmable by software) determines the configuration of arbitration counter 110 and request assertion logic 120. In this regard, programmable configuration logic 130 is used to set the predetermined count value associated with each processor state (e.g., idle, low priority, and high priority).

As indicated above, request assertion logic 120 receives processor state information from MAC processor 20. In accordance with a preferred embodiment of the present invention, MAC processor 20 has built-in hardware-based context switching. In this regard, many different contexts exist which have different priorities. The CPU engine processes events and interrupts, and determines in a single cycle which context should be running. This enables a context switch to occur, moving to an appropriate execution software thread to handle the event. Since registers for the various contexts are banked, a context switch is done quickly and efficiently with no operating system (OS) overhead to process the interrupt. A special instruction is used to suspend an execution thread and return that context to waiting state, until the next interrupt for that context occurs (similar to a blocking wait call with thread based programming). In effect, MAC processor 20 allows operating system (OS) functions to thrash between contexts, with no penalty for a context switch.

The CPU engine itself, being aware of pending events and running contexts, can also determine in a single clock cycle if all contexts are idle (e.g., no actions are required and all context execution threads are in the waiting state). Therefore, the idle/running (active) state of MAC processor 20 can be detected rapidly and efficiently in a single clock cycle without any overhead. Furthermore, the contexts are prioritized so that MAC processor 20 can determine instantaneously whether a high priority thread or a low priority thread of code is running.

The present invention's hardware-based approach to priority-based context switching provides a superior solution to the problems encountered in the prior art. In this regard, the MAC processor hardware contains different contexts built into the hardware, each context having a different priority. Therefore, the processor hardware is controlling the execution thread control of the software, not the operating system (OS) or the software application. Consequently, the reaction time is very fast, and overhead for context switching is very low. In fact, a context switch occurs with zero overhead.

The processor hardware can easily determine if a high priority context is running, since it is fully conscious of the processor state. As a result, arbitration of the shared memory can be controlled to give the MAC processor priority for bus access when it is running software in a high priority context. As indicated above, when MAC processor 20 is performing a low priority task, HOST interface 10 is given more of an 'access slice' for the shared memory bus. In some cases, access to shared memory bus 60 by HOST Interface 10 can be totally prevented, if desired, during high priority tasks; thus giving MAC processor 20 full access to the shared memory bus 60.

It should be understood that operation of priority-based arbiter 100 is programmable. This is particularly important in some applications or operating modes, were it is desired or necessary to throttle bus access. In this respect, programmable configuration logic 130 is controlled by MAC processor 20. Therefore, the software running on MAC processor 20 does have some control over how to configure the arbitration; however, it does not make the arbitration decision directly, since that is the function of priority-based arbiter 100. In this regard, arbiter 100 has "fine" control over how access to shared memory bus 60 is arbitrated. As a result, arbitration control can be done "on the fly" with no firmware or software overhead after the arbitration style is configured by programmable configuration logic 130. The rapid changes in context state of MAC processor 20 can be performed in hardware, and thus arbitration choices can be made on a "clock cycle per clock cycle" basis.

Figure 2:
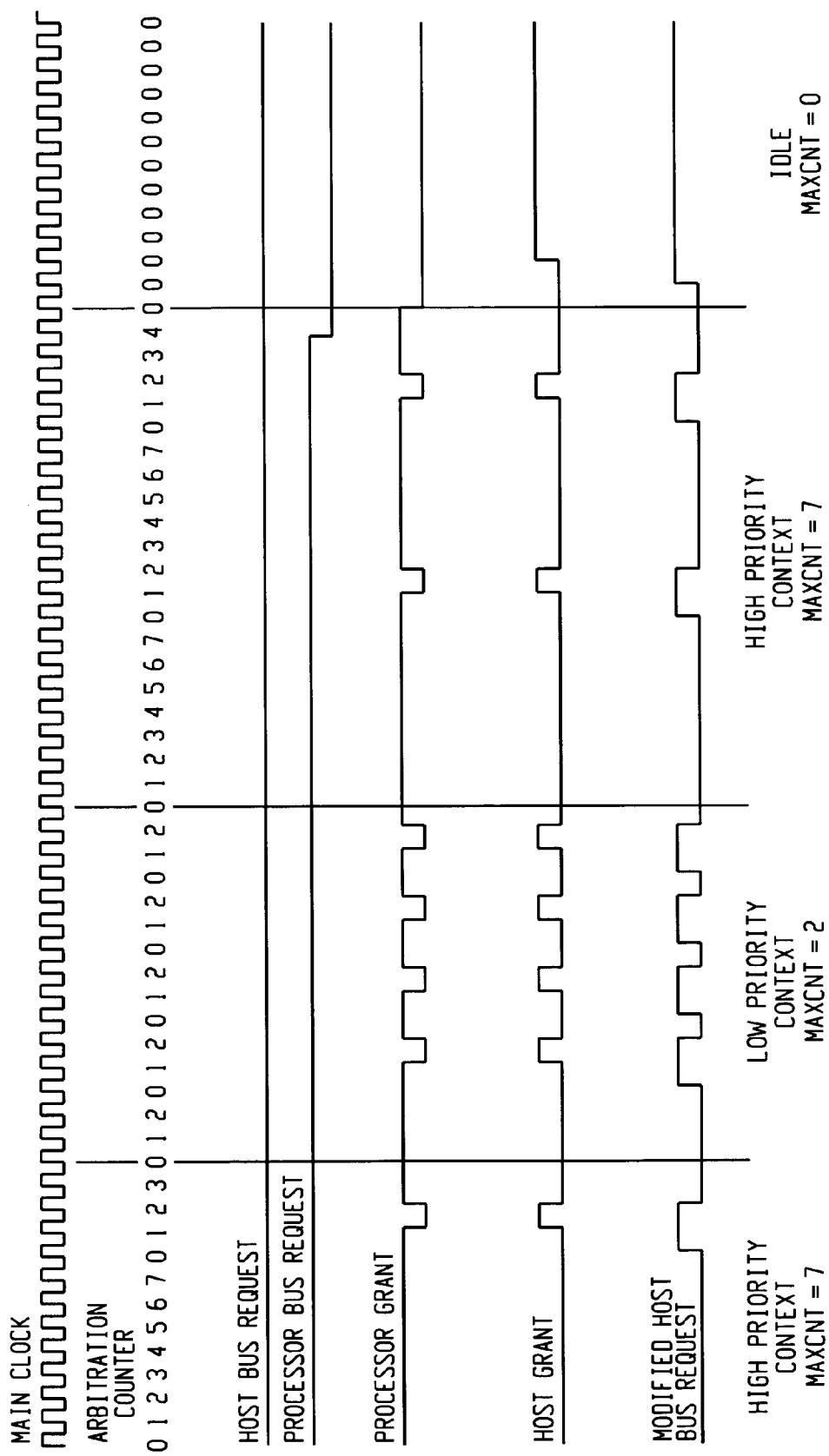
FIG. 2 is a timing diagram illustrating operation of the arbitration system shown in FIG. 1.

Referring now to FIG. 2 a sample timing diagram is illustrated for high priority context state, low priority context state and idle state. In the illustrated case, the HOST bus request signal remains continually active throughout the period shown. When MAC processor 20 is running a high priority task, MAXCNT is set, for example, at 7. Therefore, the modified HOST bus request signal will be active upon counter transition from 7 to 0. Activation of the HOST grant signal will be likewise delayed.

When MAC processor 20 is running a low priority task, it can be seen that the modified HOST bus request signal will be active upon counter transition from 2 to 0. Activation of the HOST grant signal will be likewise delayed.

Finally, when MAC processor 20 is in an idle state, processor bus request is disabled, and consequently modified HOST bus request signal will essentially be the same as the HOST bus request signal (i.e., pass through).

The value for MAXCNT will change depending upon the context state (also known as context switch). When the context state changes, the counter will be reset to zero; however this transition to zero will not cause the HOST bus request signal to be activated. Only transitions from MAX-CNT to zero will cause the HOST bus request signal to be activated, as illustrated in FIG. 2.

It should be understood that in accordance with an alternative embodiment of the present invention, "burst" access could be granted to the HOST processor each time the modified HOST bus request signal is generated. For example, 8 clock cycles of access could be granted to HOST processor 4 each time the modified HOST bus request signal is generated, rather than only 1 clock cycle. In addition, the length of the bursts could be modified depending upon whether the MAC processor is in a high priority context, low priority context or idle state. To lessen the impact from the HOST processor, a larger number of burst accesses may be allowed when the MAC processor is running low priority tasks or is idle.

Another alternative embodiment of the present invention may involve the prioritization of all contending "bus agents" for the arbitrated resource. For example, HOST interface 10 may at times demand a higher priority for a certain bus request (e.g. when a FIFO is about to overrun). In that case, by using a priority encoded HOST bus request signal, the request assertion logic 120 can evaluate the relative priority between. MAC processor 20 and HOST interface 10 to decide when the modified HOST bus request is to be asserted. Such a design may be expanded to evaluate relative priorities among two, three, four or any N number of bus agents, each of which has it's own prioritized bus request signal. Programmable software configuration can again be used to decide on the style of bus arbitration and how to prioritize the various bus requests among all bus agents.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

The invention claimed is:

1. A system for providing priority based access to a shared resource, comprising:
   a central arbiter coupled to the shared resource, the central arbiter having a first input and a second input;
   a first device having a request line for requesting access to the shared resource coupled to the first input of the central arbiter;
   a second device having a request line for requesting access to the shared resource; and
   a priority based arbiter that intercepts access requests from the request line from the second device and forwards access requests from the second device to the second input of the central arbiter; and
   wherein the priority based arbiter is responsive to a signal from the first device indicative of a priority for the first device to delay requesting access for the second device for a predetermined amount of time.

2. The system of claim 1, the priority based arbiter further comprising a counter.

3. The system of claim 2, wherein a value is input into the counter based on the signal indicative of the priority status of the first device; and the predetermined amount of time is based on the value in the counter.

4. The system of claim 3, wherein the priority based arbitrator is configured to change the value in the counter based on a change of the signal from the first device indicative of the priority status of the first device.

5. The system of claim 4, the priority based arbiter further comprises a programmable configuration logic for configuring the counter to generate the predetermined delay associated with respective context data.

6. The system of claim 1, wherein said shared resource is a bus.

7. The system of claim 1, wherein the priority based arbitrator provides no delay in generation of the modified request signal responsive to a signal from the first device indicative of an idle state.

8. The system of claim 1, wherein the priority based arbiter is responsive to the signal from the first device to control the frequency of access requests from the second device forwarded to the second input of the central arbiter based on the signal from the first device indicative of the priority for the first device.

9. A system for providing priority based access to a shared resource, comprising
   means for granting access to the shared resource having a first input and a second input;
   a first device having a first request means for requesting access to the shared resource coupled to the first input of the means for granting;
   a second device having a second request means for requesting access to the shared resource; and
   means for priority based arbitration that intercepts a request for access to the shared resource from the second request means of the second device coupled to the second input of the means for granting access;
   wherein the means for priority based arbitration is responsive to a signal from the first device indicative of a priority status of the first device to delay the request for access from the second request means of the second device to the means for granting access to the shared resource for a predetermined amount of time based on the signal indicative of the priority status of the first device.

10. The system of claim 9, the means for priority based arbitration comprising means for counting.

11. The system of claim 10, wherein a value is input into the means for counting based on the signal indicative of the priority status of the first device; and the predetermined amount of time is based on the value in the means for counting.

12. The system of claim 11, wherein the means for priority based arbitration is configured to change the value in the means for counting based on a change of the signal from the first device indicative of the priority status of the first device.

13. The system of claim 9, wherein said shared resource is a bus.

14. The system of claim 9, wherein the means for priority based arbitration provides no delay responsive to the signal from the first device indicating of an idle state.

15. A method for selectively granting access to a shared resource between a first device and a second device, comprising:
- receiving a signal from the first device requesting access to the shared resource at a first input of a central arbiter coupled to the shared resource, the signal from the first device having an associated priority level;
- intercepting a signal from a second device requesting access to the shared resource by a prioritized arbiter coupled to a second input of the central arbiter;
- receiving a signal by the prioritized arbiter indicative of the associated priority level of the signal from the first device; and
- delaying the intercepted signal from the second device requesting access to the shared resource a predetermined amount of time by the prioritized arbiter based on the associated priority level of the first device.

16. The method of claim 15, the delaying a signal farther comprising:
- initializing a counter with a predetermined initial value based on the associated priority level of the first device; and
- decrementing the counter until the counter reaches a predetermined threshold value;
- wherein the delaying continues until the counter reaches the predetermined threshold value.

17. The method of claim 16, wherein the delaying further comprises:
- re-initializing the counter responsive to a change of the associated priority level of the signal from the first device indicative.

18. The method of claim 15, wherein the delaying provides no delay responsive to a signal from the first device indicative of an idle state.

19. The method of claim 15, wherein the associated priority level is one of the group consisting of high priority, low priority, and idle.

* * * * *